Patented Aug. 3, 1926.

1,594,828

UNITED STATES PATENT OFFICE.

LEON W. GELLER, OF HAMBURG, NEW YORK, ASSIGNOR TO NATIONAL ANILINE & CHEMICAL CO. INC., OF NEW YORK, N. Y., A CORPORATION OF NEW YORK.

DISAZO DYESTUFFS CONTAINING A DIPHENYLUREA NUCLEUS.

No Drawing.    Application filed April 28, 1924. Serial No. 709,685.

This invention relates to the manufacture and production of new azo dyes which are of value for dyeing unmordanted cotton. They also dye wool, silk and other fibres. The dyed fabrics, and other material, dyed with the new dyestuffs also form a part of the present invention.

The new dyestuffs can be obtained by causing phosgene to act on a mixture comprised of different or of equimolecular proportions of 4-hydroxy-4'-aminoazobenzene-5-carboxylic acid and 4'-chlor-2-methyl-5-alkoxy-4-aminoazobenzene-5'-sulfonic acid, e. g., 4'-chlor-2-methyl-5-methoxy (or ethoxy)-4-aminoazobenzene-5'-sulfonic acid, etc., in the presence of a substance adapted to absorb hydrochloric acid such as, for example, sodium carbonate.

The new dyestuffs thus obtained, and which are probably composite mixtures, in the dried and pulverized state and in the shape of their alkali metal salts, are yellowish brown powders soluble in water with a yellow color and soluble in concentrated sulfuric acid with a yellowish red color. Upon reduction with stannous chloride and hydrochloric acid they yield 2-chlor-5-aminobenzene sulfonic acid, 2-hydroxy-5-aminobenzoic acid and 4.4'-diaminodiphenylurea bodies which upon hydrolysis decompose into diamines or diamino bodies of the benzene series. They are valuable substantive dyestuffs and dye unmordanted cotton yellow shades of excellent fastness to washing and to light and which are capable of being discharged to a white with discharging agents. They also dye wool and silk.

The following specific example will further illustrate the invention, but it is understood that the invention is not limited thereto. The parts are by weight. Example: To 363 parts (1.3) mols of the sodium salt of 4-hydroxy-4'-aminoazobenzene-5-carboxylic acid (prepared by coupling 1 mol of diazotized p-nitraniline with 1 mol of salicylic acid and subsequently reducing the nitro group to an amino group or by coupling 1 mol of diazotized p-aminoacetanilide with salicylic acid and subsequently replacing the acetyl group by hydrogen through saponification) dissolved in 10,000 parts water is added a solution of 377.5 parts (1 mol) of the sodium salt of 4'-chlor-2-methyl-5-methoxy-4-aminoazobenzene-5'-sulfonic acid (prepared by coupling 1 mol of diazotized 2-chlor-5-aminobenzene-1-sulfonic acid with 1 mol of 4-methyl-2-amino-1-methoxybenzene in the usual manner) previously dissolved in 25,000 parts of water. Into this solution, with stirring, and which is kept alkaline throughout the reaction by the necessary addition of sodium carbonate, is introduced phosgene at ordinary temperatures until no unchanged monazo dye is any longer present. The reaction is finished when a small test sample of the solution on bibulous paper shows only a faint pink color when spotted with hydrochloric acid. The presence of unchanged monazo dye produces a brownish-red color. When the reaction is complete, the new dye is precipitated by the addition of common salt to the solution, filtered off, pressed and dried.

The new dyestuff thus obtained is probably a composite product containing two or more of the dyes which in the free state correspond respectively to the following formulæ:

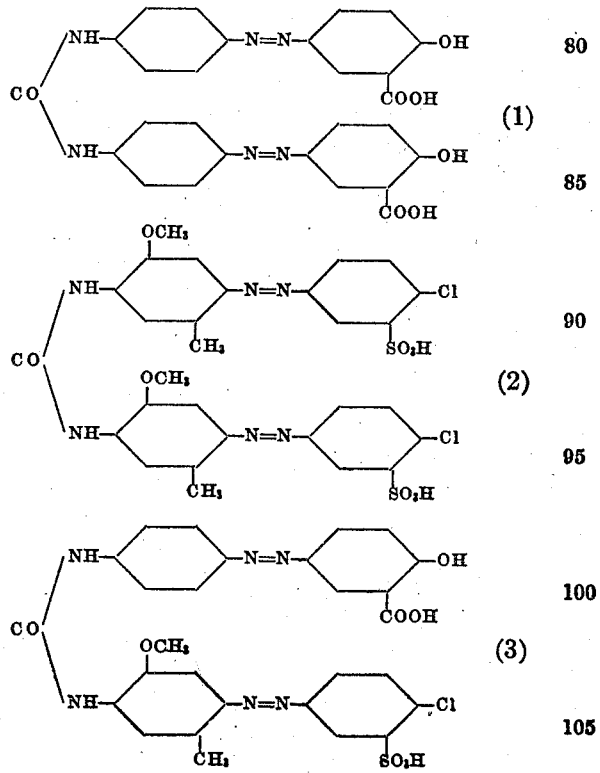

Said dyestuff, after being dried and pulverized in the form of its sodium salt, is a yellowish brown powder soluble in water with a yellow color, and soluble in concentrated sulfuric acid with a yellowish red solution which upon dilution with ice produces an orange-brown precipitate; yielding upon reduction with stannous chloride and hydrochloric acid, 2-hydroxy-5-aminobenzoic acid, 2-chlor-5-aminobenzene sulfonic acid, and 4.4′-diaminodiphenylurea bodies which upon hydrolysis decompose into diamino bodies of the benzene series and carbonic acid. It dyes unmordanted cotton lemon-yellow shades which are fast to washing and to light and are capable of being discharged to a white on treatment with discharging agents such as sodium hydrosulfite. It also dyes wool and silk yellow shades.

If the process is carried out in an analogous manner on mixtures comprising other and different molecular proportions or amounts of the above mentioned aminoazo compounds than illustrated in the example, then dyestuffs are produced which dye other shades or tints of yellow. For example, a mixture comprising equimolecular proportions of 4-hydroxy-4′-aminoazobenzene-5-carboxylic acid and 4′-chlor-2-methyl-5-methoxy-4-aminoazobenzene-5′-sulfonic acid produces, when phosgenated, a dyestuff which dyes redder shades of yellow than the dyestuff produced as illustrated in the above example, whereas a mixture comprising, for example, 1.5 molecular proportions of the former aminoazo compound and one mol of the latter gives, when phosgenated, a dyestuff which produces greener shades of yellow. It is to be understood that the present invention includes dyestuff obtainable by phosgenating mixtures comprised of equimolecular or of different and various molecular proportions of the above mentioned aminoazo compounds.

Analogous dyestuffs possessing similar qualities are obtainable by treating with phosgene in a similar manner, alkaline mixtures comprised of equimolecular or of various proportions of 4-hydroxy-4′-aminoazobenzene-5-carboxylic acid and 4′-chlor-2-methyl-5-ethoxy-4-aminoazobenzene-5′-sulfonic acid.

It will be understood that the new dyestuffs are probably composite products containing two or more dyes of the type represented by the formulæ given in the above example, except when equimolecular proportions of the intermediates are employed in their production they may consist of a single dye and not a mixture.

In the specifications and claims it will be understood that the term "alkoxy" denotes and includes alkyl derivatives of the hydroxyl group, such as $OCH_3$ (methoxy), $OC_2H_5$ (ethoxy), etc.

I claim:

1. As new products, the azo dyestuffs obtainable by subjecting a mixture comprising 4-hydroxy-4′-aminoazobenzene-5-carboxylic acid and 4′-chlor-2-methyl-5-alkoxy-4-aminoazobenzene-5′-sulfonic acid in the presence of sodium carbonate to the action of phosgene, said dyestuffs, in the dried and pulverized state and in the shape of their sodium salts, being yellowish brown powders soluble in water with a yellow color and soluble in concentrated sulfuric acid with a yellowish red color, yielding upon reduction, 2-chlor-5-aminobenzene sulfonic acid, 2-hydroxy-5-aminobenzoic acid, and 4.4′-diaminodiphenylurea bodies which upon hydrolysis decompose into diamino bodies of the benzene series, and carbonic acid; and dyeing unmordanted cotton reddish yellow to greenish yellow shades which are capable of being discharged to a white with sodium hydrosulfite.

2. As a new dyestuff, the azo dyestuff obtainable by subjecting a mixture comprising about 1.3 mols of 4-hydroxy-4′-aminoazobenzene-5-carboxylic acid and about one mol of 4′-chlor-2-methyl-5-methoxy-4-aminoazobenzene-5′-sulfonic acid in the presence of sodium carbonate to the action of phosgene, said dyestuff, in the dried and pulverized state and in the shape of its sodium salt, being a yellowish brown powder soluble in water with a yellow color and soluble in concentrated sulfuric acid with a yellowish red color which on addition of ice produces an orange-brown colored precipitate, yielding on reduction, 2-chlor-5-aminobenzene-sulfonic acid, 2-hydroxy-5-aminobenzoic acid, and 4.4′-diaminodiphenylurea bodies which upon hydrolysis decompose into diamino bodies of the benzene series, and carbonic acid; and dyeing unmordanted cotton yellow shades which are capable of being discharged to a white with sodium hydrosulfite.

3. Materials dyed with the dyestuffs of claim 1.

4. Materials dyed with the dyestuff of claim 2.

In testimony whereof I affix my signature.

LEON W. GELLER.